United States Patent
Seely et al.

(10) Patent No.: US 10,218,493 B2
(45) Date of Patent: Feb. 26, 2019

(54) RADIO WITH DYNAMICALLY CONTROLLED CORRELATION THRESHOLD

(71) Applicant: Itron, Inc., Liberty Lake, WA (US)

(72) Inventors: Danny Ray Seely, Spokane Valley, WA (US); Junsong Lin, Spokane Valley, WA (US); Michael David McNamee, Anacortes, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 15/443,495

(22) Filed: Feb. 27, 2017

(65) Prior Publication Data

US 2018/0248681 A1    Aug. 30, 2018

(51) Int. Cl.
| | |
|---|---|
| *H04L 12/24* | (2006.01) |
| *H04W 40/00* | (2009.01) |
| *H04J 3/22* | (2006.01) |
| *H04L 12/26* | (2006.01) |
| *H04L 7/04* | (2006.01) |
| *H04L 1/00* | (2006.01) |
| *H04L 1/20* | (2006.01) |

(52) U.S. Cl.
CPC .......... *H04L 7/042* (2013.01); *H04L 1/0045* (2013.01); *H04L 1/203* (2013.01); *H04L 43/0823* (2013.01); *H04L 43/16* (2013.01)

(58) Field of Classification Search
CPC ....... H04L 7/042; H04L 1/0045; H04L 1/203; H04L 27/2675; H04L 43/0823; H04L 43/16; H04L 27/2613; H04W 84/12; H04W 76/20; H04B 1/709

USPC .......................................................... 370/503
See application file for complete search history.

(56) References Cited

U.S. PATENT DOCUMENTS

| | | | |
|---|---|---|---|
| 8,014,270 B2* | 9/2011 | Halford | H04L 27/0008 370/203 |
| 8,958,506 B2* | 2/2015 | Seely | H04L 27/16 375/341 |

(Continued)

FOREIGN PATENT DOCUMENTS

| | | |
|---|---|---|
| WO | WO2005083943 A1 | 9/2005 |
| WO | WO2014131036 A1 | 8/2014 |

OTHER PUBLICATIONS

PCT Search Report and Written Opinion dated Jun. 1, 2018 for PCT Application No. PCT/US18/19778, 11 pages.

*Primary Examiner* — Edan Orgad
*Assistant Examiner* — Vanneilian Lalchinthang
(74) *Attorney, Agent, or Firm* — Lee & Hayes, P.C.

(57) ABSTRACT

In a radio using a plurality of channels defined in a radio frequency (RF) spectrum, a rate of false packet detections may be calculated for each of the plurality of channels using a plurality of respective correlation thresholds. The rate of false packet detections for each channel may be compared to a range of acceptable rates of false packet detections. The same or different ranges of acceptable rates of false packet detections may be used for each channel or each channel plan. Different correlation thresholds may be adjusted based at least in part on the comparisons. For example, if a rate of false packet detections exceeds a range of acceptable rates of false packet detections, the correlation threshold may be raised, or the reverse. A packet may be detected on different channels based on different adjusted correlation thresholds.

20 Claims, 7 Drawing Sheets

(56) References Cited

U.S. PATENT DOCUMENTS

| | | | |
|---|---|---|---|
| 2004/0081205 A1* | 4/2004 | Coulson | H04L 27/2656 370/503 |
| 2005/0266803 A1 | 12/2005 | Dinur et al. | |
| 2007/0060162 A1* | 3/2007 | Xhafa | H04W 28/20 455/450 |
| 2009/0003308 A1* | 1/2009 | Baxley | H04B 1/59 370/350 |
| 2010/0107042 A1* | 4/2010 | Sawai | H04L 27/2655 714/799 |
| 2011/0096685 A1* | 4/2011 | Lee | H04L 27/0012 370/252 |
| 2015/0139008 A1* | 5/2015 | Meilhac | H04L 27/261 370/252 |

* cited by examiner

RADIO WITH DYNAMICALLY CONTROLLED CORRELATION THRESHOLD

BACKGROUND

An incoming radio signal may be correlated with an expected preamble/synchronization word to determine if the incoming signal is a packet. However, while a correlator in a decoder of a radio may indicate that the signal exceeds a threshold energy value indicating a match to the expected preamble, in some cases this may be coincidental. Accordingly, false packet detection is common. Such false packet detections waste time and battery power, and such poor allocation of processor resources may result in failure to recognize actual packets.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for detecting data packets defined in radio frequency (RF) signals, and for managing a number of false packet detections (i.e., signals identified as packets when in fact the signals were not packets). At least in part because the techniques may reduce the load on a processor, the processor may be able reduce the incidence of signals representing packets that are not recognized.

In an example illustrating some of the techniques discussed herein, a signal is initially identified as a packet when aspects of the signal, such as comparison of the signal to an expected packet preamble, exceed a correlation threshold. However, some such identifications are later revealed to be erroneous, such as when attempts are made to decode later portions of the preamble and/or a data payload. Over time, inaccurate packet identifications result in a calculable rate of false packet detections. This rate of false packet detections may be compared to an indicator, such as a range of acceptable rates of false packet detections. When the rate of false packet detections exceeds the range, the correlation threshold may be increased, to require additional certainty before finding a correlation between a signal and a preamble of a packet. When the rate of false packet detections is below the range, lowering the correlation threshold may accelerate recognition of signals that are actually packets. When the rate of false packet detections is within the range, no adjustment of the correlation threshold is required. In example use of the correlation threshold, an incoming signal may be examined. If correlation of the signal to a known packet preamble exceeds the correlation threshold, the signal may be recognized as at least part of a packet. Accordingly, lowering the correlation threshold may allow for the detection of signals further into the noise/interference floor. However, this may be at the expense of higher rates of false packet detections, and may result in more processing expense. Alternatively, raising the correlation threshold may result in less sensitivity, lower false packet detections, and may have a net effect of reducing processing load.

Example System and Techniques

Figure 1:
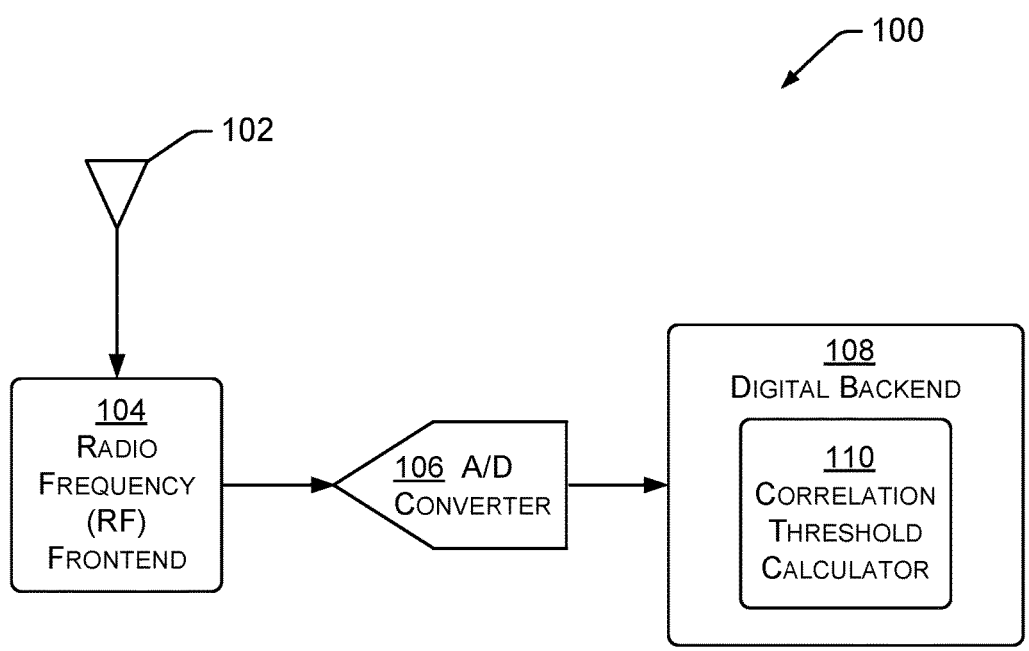
FIG. 1 is a schematic diagram showing a radio having an analog radio frequency (RF) frontend, an analog-to-digital converter, a digital backend, and a first example of a correlation threshold calculator.

FIG. 1 shows an example radio 100, having an antenna 102 to receive radio frequency (RF) signals. An RF frontend 104 is configured to process analog signals received by the antenna 102. An analog-to-digital (A/D) converter 106 is configured to receive the analog signals of the RF frontend 104 as input, and to produce a digital signal as output. The digital signal is received for processing by a digital radio, a software-defined radio, and/or a digital signal processor, such as the digital backend 108. The digital backend 108 may correlate an incoming digital signal to a known packet preamble, and determine if the correlation exceeds a correlation threshold. If the correlation exceeds the correlation threshold, the signal is decoded as a packet. In the examples discussed herein, the term "preamble" and a "synchronization word" should be considered to be synonymous.

The digital backend 108 may include a correlation threshold calculator 110 that is configured to change or adjust one or more correlation thresholds for use in one or more channels, channel plans, and/or with one or more modulation schemes. Accordingly, the radio 100 is able to adapt to changing RF noise conditions, by dynamically changing a plurality of correlation thresholds to rapidly recognize packets in low RF noise conditions and to recognize packets with greater certainty in high RF noise conditions. The plurality of correlation thresholds may be associated with a plurality of respective channels, a plurality of respective modulation schemes for use in a single channel, or some combination of these implementations.

Additionally, the radio 102 is well-suited for use in receiving signals near, at, or below the noise floor. However, as interference levels (and by extension, the noise floor) change in each channel and/or channel plan, the correlation threshold used in association with any channel and/or channel plan may be changed in response. Accordingly, as a plurality of noise floors, in a respective plurality of channels, changes over time, the correlation thresholds associated with each channel may be individually and/or differently changed in response.

Example Channelizer, Decoder and Correlation Threshold Calculator

Figure 2:
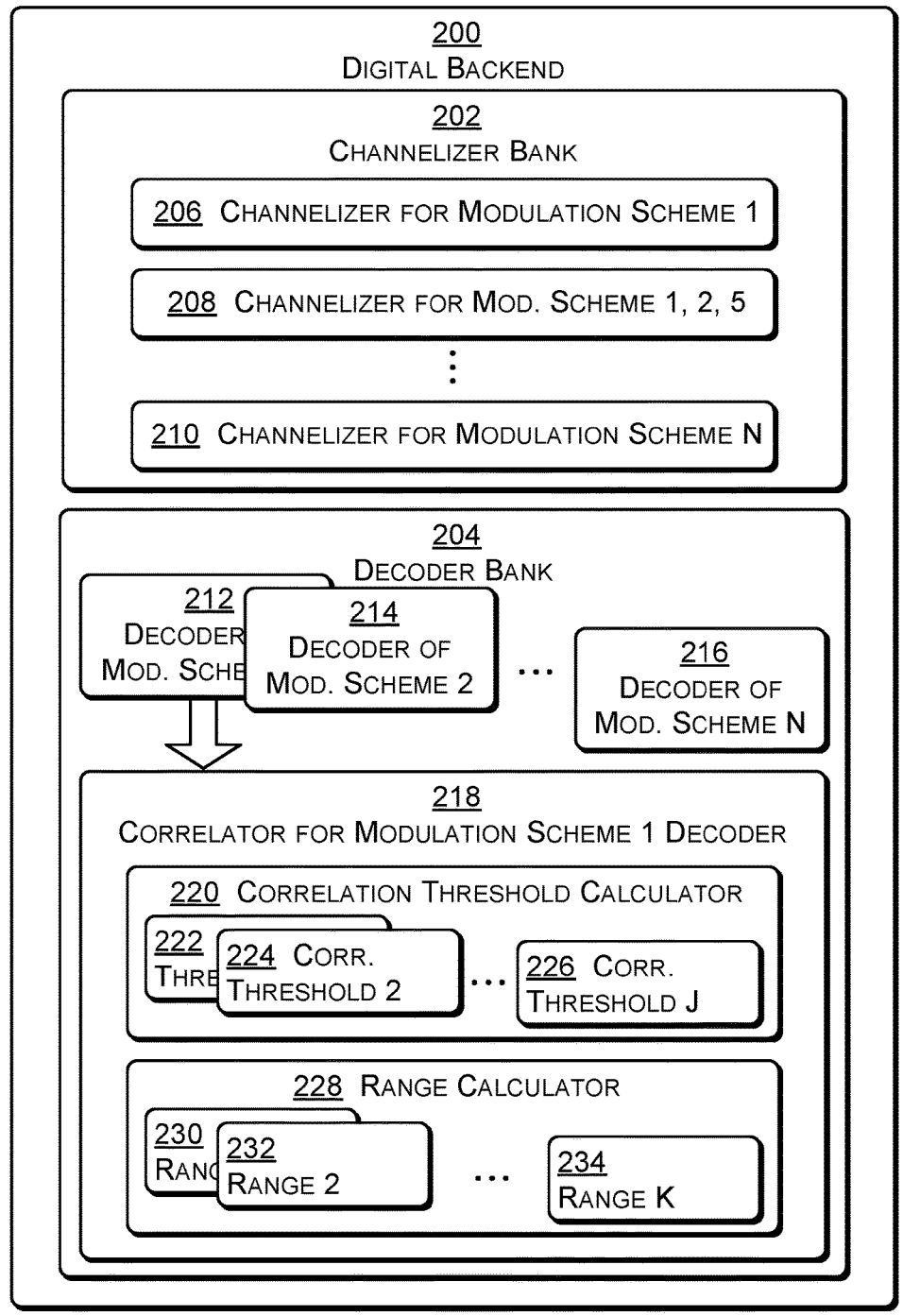
FIG. 2 is a schematic block diagram showing a further example of a digital backend, and a second example of a correlation threshold calculator.

FIG. 2 shows the digital backend 200 of an example radio configured to dynamically change a plurality of correlation thresholds used in a plurality of respective channels, with a plurality of respective modulation schemes in a single channel, or some combination of these implementations. The digital backend 200 includes a channelizer bank 202, which digitizes portions of RF spectrum according to at least one channel plan, each of which includes at least one channel. Digital data from each channelizer, representing a channel plan, is sent to one or more decoders in a decoder bank 204. In the example, correlation thresholds are adjusted to manage rates of false packet detection in each of a plurality of channels and/or channel plans, and/or with each of a plurality of modulation schemes. By dynamically controlling correlation threshold levels(s), false packet detection levels may be managed to result in better resource allocation. Accordingly, a balance or tradeoff between advantageously correlating to, and/or recognizing, low-level signals (e.g., signals that are near the noise/interference floor) at the expense of a higher than desired rate of false packet detections may be managed to achieve a targeted level of performance.

A channelizer bank 202 may include one or more channelizers. Each channelizer digitizes one or more portions of RF spectrum (i.e., creates digital data associated with one or more "channels," which may constitute a channel plan). The resulting digital data is sent to one or more decoders. Accordingly, each decoder may be associated with a channelizer, from which it receives digitized portions of the RF spectrum. In some instances, two or more decoders that are associated with the same channel plan may receive input from the same channelizer. Each decoder "decodes" an incoming digital data according to a modulation scheme with which the decoder is associated.

In the example of FIG. 2, the channelizer bank 202 includes a plurality of individual channelizers 206, 208 and 210. Each channelizer is associated with a channel plan that includes one or more channels, and each channel is associated with a digitized portion of RF spectrum. Each channelizer 206-210 (if in actual operation) may also be associated with at least one decoder in the decoder bank 204. Accordingly, each channelizer provides digital input to one or more decoders in the decoder bank. In the example shown, channelizer 206 provides input to a decoder associated with modulation scheme 1, while channelizer 208 provides input to decoders associated with modulation schemes 1, 2 and 5, and channelizer 210 provides input to a decoder associated with modulation scheme N.

The decoder bank 204 may include one or more decoders 212-216. Each decoder is associated with a modulation scheme, such as FSK, OOK and others. Each decoder receives digitalized input associated with a channel plan (one or more channels) from a channelizer, and each decoder produces decoded packets as output.

An example correlator 218, associated with decoder 212 and modulation scheme 1 is shown. The correlator 218 receives an input signal from a channel (from among a channel plan sent by a channelizer to decoder 212) and determines if the input signal represents a packet. In an example, the input signal is compared to a known preamble type, and if the comparison exceeds a correlation threshold value, then the signal is processed as if it is a packet. For example, if an energy associated with a match between the signal and the known preamble exceeds the correlation threshold, then the signal is treated as an incoming packet. Thus, the correlation threshold is a tool that may be used to control a level of certainty that a received signal is actually an incoming packet.

The correlator 218 may include a correlation threshold calculator 220. Alternatively, the correlation threshold calculator 220 may be located in other portion(s) of a digital backend, digital processor, software defined radio, etc. The correlation threshold calculator 220 may increase, decrease or maintain the value of correlation threshold(s). By increasing a correlation threshold, a greater certainty is required before a signal is definitively matched to a type of packet preamble. This results in fewer false packet detections, but may result in non-detection of valid packets. By decreasing a correlation threshold, less certainty is required before a signal is definitively matched to a type of packet preamble. This may result in more false packet detections, but also in the detection of more valid packets.

In an example, the correlation threshold calculator 220 increases, decreases or maintains the value of a correlation threshold based on a comparison of a rate of false packet detections to a range of acceptable rates of false packet detections.

The "range of acceptable rates of false packet detections" of a network node may be based at least in part on that node's processing capability. In an example, a low-cost, low-power consumption, processor may be used to lower costs and/or increase battery life (if applicable). However, a processor in the network node may be overtaxed and/or unable to function properly if too many false packet detections are observed. Accordingly, selection of an appropriate range of acceptable rates of false packet detections may be based at least in part on processing capacity. Selection of an appropriate range of acceptable rates of false packet detections provides some control and/or optimization over the tradeoff between the desirable detection of small, low power, signals, which is achieved at least in part at the expense of greater numbers of false packet detections. The range of acceptable rates of false packet detections should be selected so that processor is able to process the resulting number of false packet detections. Accordingly, the selection of the range of acceptable rates of false packet detections is based at least in part on, or is a function of, the processing capability of a network node, and the processor's ability to handle false packet detections. In one example, the range of acceptable rates of false packet detections may be 20 to 40 false packet detections per hour. Such a range may apply to each individual channel. Accordingly, in a 512-channel radio, 20 false packet detections per hour results in 10240 false packet detections for the entire radio. In a further example, the range of acceptable rates of false packet detections may be 100 to 150 false packet detections per hour. However, specific numbers used when defining a range of acceptable rates of false packet detections may be based on specific networks, specific processors, radios, radio spectrum condition and other factors, and can vary widely from processor to processor, from network to network and between various geographic areas.

False packet detections result when an incoming signal correlates to a known packet preamble type, but upon decoding, the signal fails to actually be a packet. In an example, random interference could have appeared to be a packet preamble, or at least the beginning of a packet preamble. By keeping statistics on such false packet detections, a rate of false packet detections can be determined. The rate of false packet detections can be compared to a range of acceptable rates of false packet detections, to determine if the correlation threshold should be increased, decreased or maintained at the same value.

The correlation threshold calculator 220 may manage one or more correlation threshold values. In the example shown, each of a plurality of channels that are decoded using modulation scheme 1 may be associated with a different one of the correlation thresholds 222-226. In another example, a single correlation threshold could be used for a plurality of modulation schemes over a plurality of channels. In other examples, the plurality of correlation threshold values 222-226 may be used in association with different channels, different channel plans, different modulation schemes and/or different combinations of these or other factors.

In some instances, correlator 218 or other portion of the digital backend 200 may include a range calculator 228, to calculate, fix, and/or adjust one or more ranges of acceptable rates of false packet detections (i.e., the range to which the rate of false packet detections is compared). In some examples, a single range of acceptable false packet detections may be used for all channels and all modulation schemes. Alternatively, different ranges 230-234 may be used for different channels, channels plans and/or different modulation schemes. In some examples the range used may be factory set and held constant. In other examples, the range may be changed as circumstances change. For example, the range calculator 228 may change one or more of the ranges 230-234 of acceptable rates of false packet detections in response to a change in the size of the network (e.g., the number of nodes), changes in the modulation schemes used, changes in channel plans or frequency spectrum used, changes in background interference, or other factors. When one or more ranges of acceptable false packet detections is changed, comparison of the rate of false packet detections to the changed range may result in application of a different change to a correlation threshold. In a further example, the correlation threshold can be set so high that it can be used to intentionally disable a channel. This technique could be employed if a specific channel was deemed unusable, such as due to persistently elevated interference that chronically causes false packet detections.

Example Radio with a Plurality of Correlation Threshold Calculators

Figure 3:
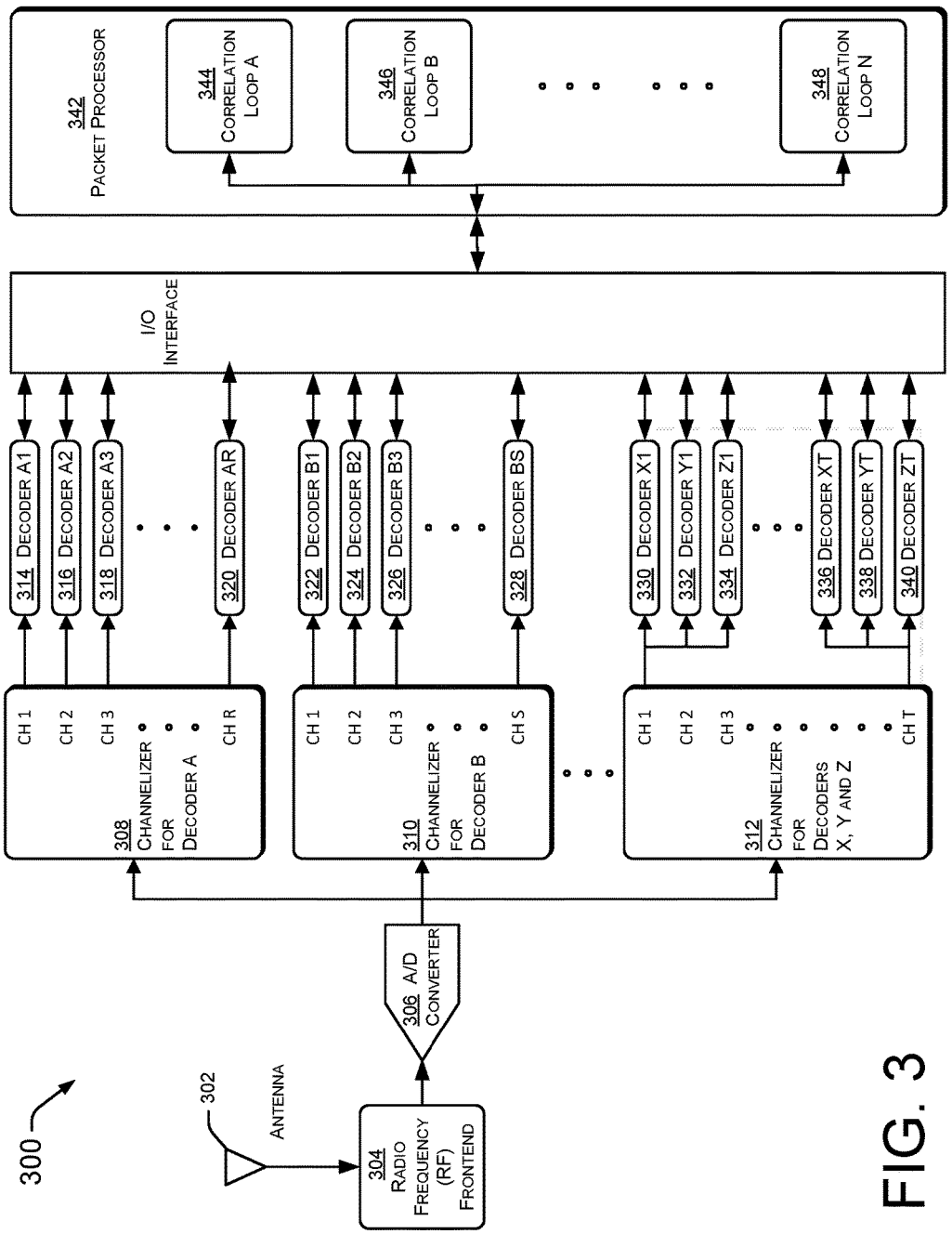
FIG. 3 is a schematic block diagram showing detail of a further example radio, having pluralities of channelizers, decoders, and correlation loops (each loop to adjust a correlation threshold or value).

FIG. 3 shows a radio 300, having a plurality of channelizers, decoders, and correlation loops. In the example, any number of channelizers may be used to define any number of channel plans, each channel plan having one or more channels, with any desired regular or non-regular channel spacing, regular or non-regular channel widths and/or channel frequencies. Each channelizer may provide digital output to one or more decoders, wherein each decoder is associated with a particular modulation scheme (FSK, OOK, etc.). A plurality of correlation loops may be associated with a respective plurality of correlation thresholds. Each correlation threshold may be used to determine if an incoming signal has a valid correlation with a particular type of packet preamble (or is alternatively a signal associated with an undesired type of packet or other interference). Each individual channel, channel plan, modulation scheme and/or combination of two or more of these or other elements may be associated with a particular correlation threshold.

An antenna 302 provides analog RF information to a radio frequency frontend 304. The analog signal from the RF frontend 304 is digitized by an analog-to-digital converter 306. Digital signals from the A/D converter 306 pass to one or more channelizers 308-312. In similar techniques, I/Q signals could be used, which may be supported by 2 A/D converters. Accordingly, A/D conversion is broadly interpreted as processing of real or quadrature (I/Q) signals. Each channelizer may define a channel plan having one or more channels, each channel plan having any desired regular or non-regular channel spacing, regular or non-regular channel widths, and/or regular or non-regular channel frequencies. Each channelizer provides digital data, based on that channelizer's particular channel plan, to one or more decoders.

Each channelizer 308-312 may provide digital output to one or more decoders, wherein each decoder is associated with a particular modulation scheme. In the example shown, channels 1 through "R" of channelizer 308 are sent to decoders 314-320 associated with "modulation scheme A." Similarly, channels 1 through "S" of channelizer 310 are sent to decoders 322-328 associated with "modulation scheme B." Channelizer 312 sends its output associated with channels 1 through T to three different decoders 330-340, associated with three different modulation schemes. Thus, the channel plan associated with channelizer 312 is used by three modulation schemes, represented by decoders 330-340.

Figure 4:
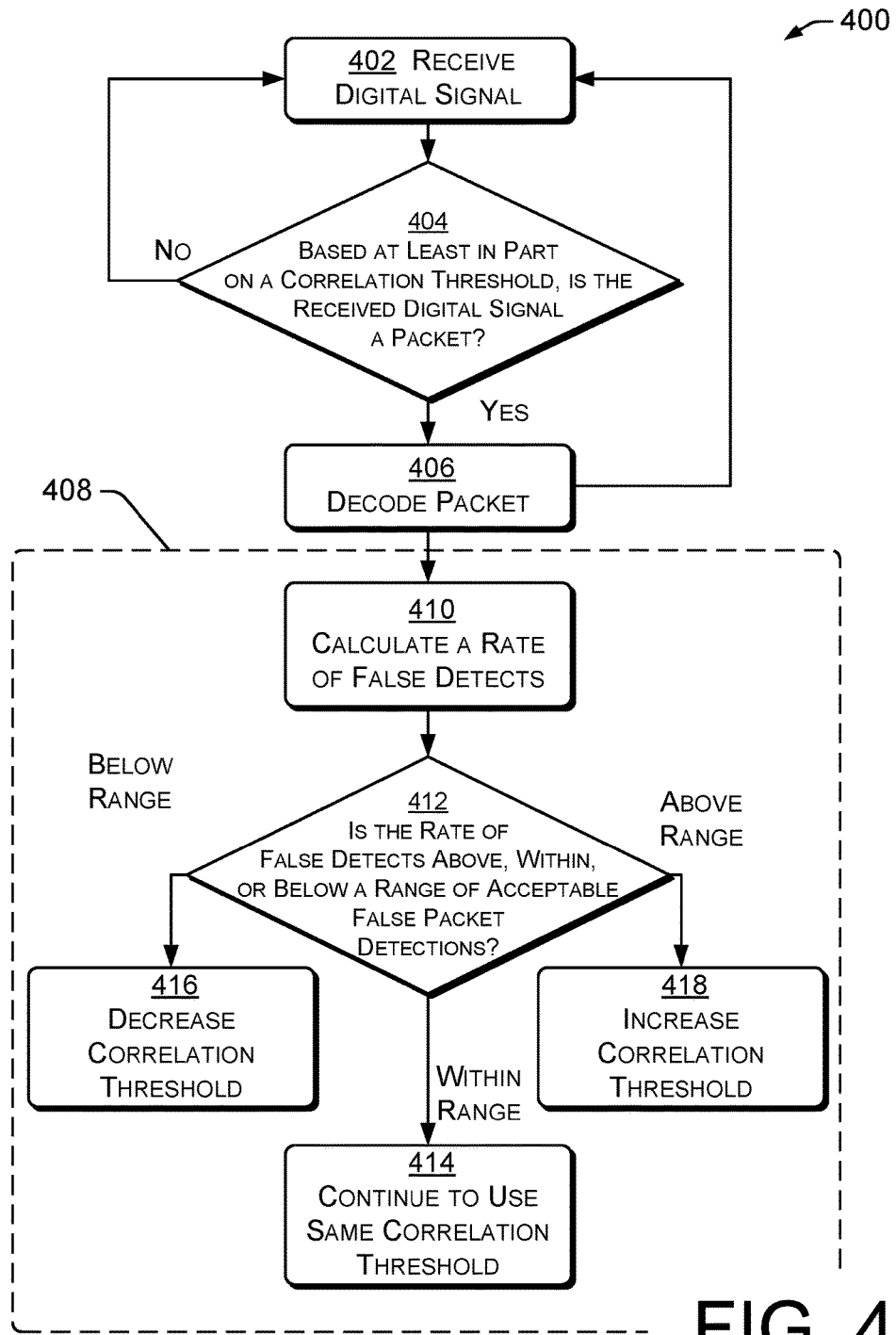
FIG. 4 is a flowchart showing example techniques used by a radio configured to adjust a correlation threshold based at least in part on changing rates of false packet detections.

Each of the decoders 314-340 uses a correlation threshold to determine if an incoming signal is sufficiently correlated with a particular type of packet preamble. That is, the decoders determine if a degree of correlation of the incoming signal with a particular packet preamble exceeds the threshold value. While all of the decoders could use the same correlation threshold, the decoders 314-340 could use different correlation thresholds selected from among a plurality of correlation thresholds. In the example shown, a packet processor 342 maintains a number N correlation thresholds in correlation loops 344-348. Each correlation loop 344-348 compares a current rate of false packet detections (e.g., for a particular channel or a particular channel plan, or for a particular modulation scheme within a particular channel or channel plan) to a range of acceptable rates of false packet detections. If the current rate of false packet detections is above the range, increasing the correlation threshold will bring the rate of false packet detections down and into the range. If the current rate of false packet detections is below the range, decreasing the correlation threshold will raise the rate of false packet detections into the range, and result in the detection of more valid packets. If the current rate of false packet detections is within the range, the correlation threshold may be left unchanged. FIG. 4 shows an example of how each correlation threshold could be adjusted in response to changing rates of false packet detections.

Example Methods

In some examples of the techniques discussed herein, the methods of operation may be performed by one or more gate arrays, application specific integrated circuits (ASIC) general purpose processor(s) utilizing software defined in computer readable media. In the examples and techniques discussed herein, a radio's digital backend may be configured in hardware and/or software, and may comprise computer-readable media, including volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Examples of Correlation Threshold Calculation

Figure 5:
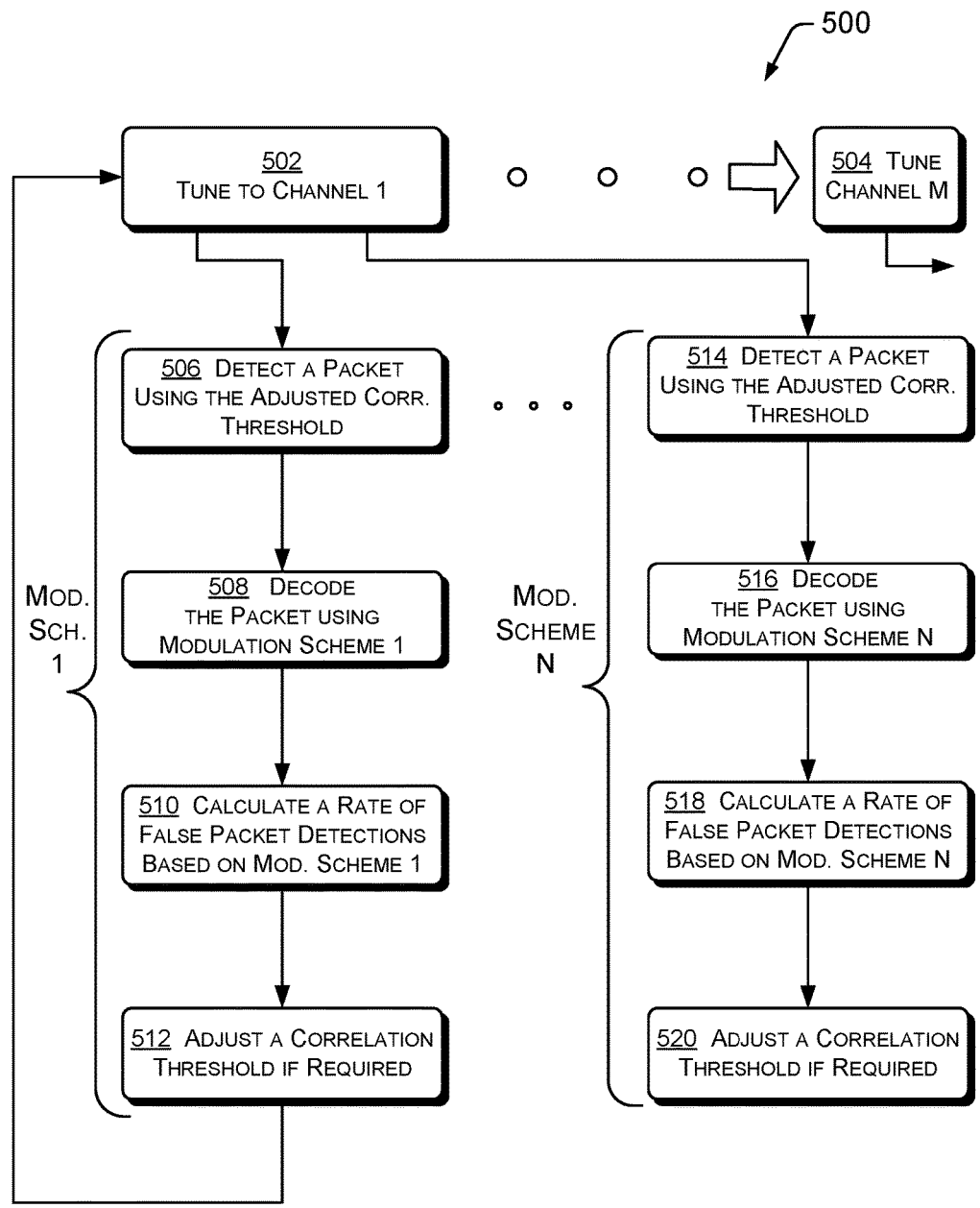
FIG. 5 is a schematic diagram showing example techniques by which a radio may be configured to associate a plurality of channels or channel plans with a plurality of modulation schemes (decoders) and to adjust a plurality of correlation thresholds.

FIG. 4 shows example methods and techniques 400 used by a radio configured to adjust a correlation threshold based at least in part on changing rates of false packet detections. In some applications, the correlation threshold calculator 220 of FIG. 2 and/or the correlation loops 344-348 of FIG. 3 may use techniques described by, or related to, those discussed with respect to FIG. 4. The techniques 400 show adjustment of a particular correlation threshold (e.g., at blocks 410-414). While FIG. 4 and associated techniques 400 show the operation of a single correlation threshold loop, similar techniques could be used in the multiple loop examples of the innovations that are shown in FIGS. 3 and 5. Thus, the techniques 400 could be used simultaneously to adjust the correlation thresholds associated with each of a plurality of channels and/or modulation schemes. In an example adjustment of a plurality of correlation thresholds, a first correlation threshold associated with a first channel may be increased, and a second correlation threshold associated with a second channel may be decreased.

At block 402 a digital signal is received. The digital signal may have been sent by a channelizer (e.g., a channelizer from among channelizers 206-210 of FIG. 2) and received by a decoder (e.g., a decoder from among decoders 212-216 of FIG. 2).

At block 404, the incoming signal is compared to a relevant packet preamble, and the results of the comparison evaluated against the adjusted correlation threshold (which may have been maintained, lowered or raised by blocks 412-418, respectively). If correlation to a packet is not indicated by the correlation threshold, additional signals are received at block 402.

At block 406, if correlation is indicated by the correlation threshold at block 404, i.e., if a packet is detected in an incoming signal, the packet is decoded.

At block 408, a correlation threshold is adjusted. In an example, block 408 adjusts the correlation threshold in the background of the signal receiving process. In an example, one or more correlation thresholds may be adjusted by the correlation threshold calculator 220 of FIG. 2 (or alternatively, a digital backend, signal processor, etc.). Blocks 410-418 show one example of how a correlation threshold may be adjusted in response to comparison of a rate of false packet detections to a range of acceptable false packet detections. The rate of false packet detections may be associated with a particular channel, a particular channel plan, optionally taking into account use of a particular modulation scheme. The correlation threshold is used when comparing an incoming signal to a packet preamble. In particular, where a measure of the similarity between an incoming signal and a packet preamble type of interest exceeds the correlation threshold, then the incoming signal is treated as an incoming packet. The rate of false packet detections may be reevaluated and/or recalculated at any desired interval, and used to change a corresponding correlation threshold. For example, false packet detections may be measured over an interval of one minute or less (e.g., 50 seconds), to rapidly respond to changes in background noise. Alternatively, an interval of one hour or more may be used to calculate the rate of false packet detections. Such an interval conserves processing power, but does not respond as quickly to changes in RF noise.

Within the example of block 408, at block 410, a rate of false packet detections is calculated. The rate of false packet detections may be based on a number of incoming signals that are correlated to known or desired packet preambles, but that are later revealed to have been falsely correlated. The rate of false packet detections may be based on a number of false packet detections recognized per minute, hour, day, month, etc. The rate of false packet detections calculated with respect to any particular channel, channel plan, or range of spectrum, may change over time. In some implementations, a rate of false packet detections may be calculated for particular channel(s) or channel plan(s) using a single modulation scheme. In other implementations, a rate of false packet detections may be calculated for a particular channel or channel plan for each of two or more different modulation schemes. And in still other implementations, a rate of false packet detections may be calculated for a first channel based on signals decoded by a first modulation scheme, and the rate of false packet detections may be calculated for a second channel based on signals decoded by a second modulation scheme.

At block 412, it is determined if the calculated rate of false packet detections is above, within, or below a range of acceptable false packet detections. The determination may be made by comparing a rate of false packet detections to a range of acceptable rates of false packet detections. As discussed with respect to the range calculator 228, the range of acceptable false packet detections may be fixed, or may be adjusted over time (e.g., adjusted as a function of network size or number of modulation schemes in use).

At blocks 414 through 418, the correlation threshold may be adjusted, if indicated by the comparison (at block 412) of the rate of false packet detections to the range of acceptable rates of false packet detections. At block 414, if the rate of false packet detections is within the range of acceptable false packet detections, then the current correlation threshold continues to be used with minimal or no adjustment. However, if the rate of false packet detections is below the range of acceptable false packet detections, then at block 416 the correlation threshold is lowered. A lower threshold will raise the rate of false packet detections into the range of acceptable false packet detections and result in the detection of more valid packets. And further, if the rate of false packet detections is above the range of acceptable false packet detections, then at block 418 the correlation threshold is raised. A higher correlation threshold examines incoming signals more carefully, thereby resulting in fewer false packet detections and associated processing overhead.

FIG. 5 shows example methods and techniques 500 by which a radio may be configured to associate a plurality of channels or a plurality of channel plans with a plurality of decoders having different modulation schemes, and techniques to adjust a plurality of correlation thresholds. The channel plans may have regular or irregular channel widths and/or regular or irregular channel spacing. Modulation schemes used to decode signal within the channel plans may include phase-shift keying (PSK), frequency-shift keying (FSK), amplitude-shift keying (ASK), quadrature amplitude modulation (QAM) and/or others. In operation, a radio may tune a plurality of channels (and/or channel plans) 502 through 504. In the example shown, "M" channels or channel plans are tuned by respective channelizers. Each channel or channel plan may be sent to one or more decoders, wherein each decoder is associated with a modulation scheme. In the example of FIG. 5, "N" modulation schemes and decoders are shown, thereby indicating that the number of modulation schemes that can be used on any particular channel and/or channel plan may be selected as needed.

At block 506, a packet is detected within an incoming signal by comparing the incoming signal to a packet preamble of interest, and measuring the results of the comparison against the adjusted correlation threshold. In an example, where energy of the incoming signal with respect to the packet preamble of interest exceeds the adjusted correlation threshold, the signal is assumed to represent a packet preamble and/or valid data. At block 508, the packet is decoded from the incoming signal using modulation scheme 1.

In the example of channel 1 and modulation scheme 1, an incoming signal is compared to a particular packet preamble, and evaluated according to a correlation threshold that has been adjusted based at least in part on a comparison of a rate of false packet detections to a range of acceptable false packet detections. At block 510, the rate of false packet detections is calculated. The rate of false packet detections is based on a signal from channel 1 and decoding performed by modulation scheme 1. In other examples of the calculating, the rate of false packet detections may be calculated for each channel from among at least two (of the M) channels using the same modulation scheme. Alternatively, a rate of false packet detections may be calculated within a particular channel or channel plan for at least two (of the N) modulation schemes.

At block 512, the correlation threshold associated with a channel is adjusted, if required. The adjustment may be performed as described with respect to block 408 of FIG. 4. In an example of the adjusting, a first correlation threshold associated with a first channel may be increased, and a second correlation threshold associated with a second channel may be decreased. These adjustments may reflect different packet transmission activity, different RF interference or other differences between the two channels. These adjustments may alternatively or additionally reflect an increased rate of false packet detections in the first channel and a decreased rate of false packet detections in a second channel.

In a further example of the adjusting, the calculated rate of false packet detections for each channel may be compared to a range of acceptable false packet detections, and a correlation threshold for a channel may be adjusted if the compared calculated rate of false packet detections for that channel is outside the range of acceptable false packet detections.

In a further example of the adjusting, a correlation threshold for a channel may be increased if the rate of false packet detections for the channel is above a range of acceptable false packet detections per unit time. The correlation threshold for the channel may be decreased if the rate of false packet detections for the channel is below the range of acceptable false packet detections per unit time. And further, the correlation threshold for the channel may remain the same if the rate of false packet detections for the channel is within the range of acceptable false packet detections per unit time.

At blocks 514-520, a similar process may involve detection of a packet by correlation of an incoming signal to a packet preamble of interest using a correlation threshold (e.g., an adjusted correlation threshold). The detected packet may be decoded, such as by a decoder using modulation scheme N in channel 1. Once decoded, a calculation to determine a rate of false packet detections may be performed. Depending on the rate calculated, an adjustment of a correlation threshold may be performed.

In additional blocks implied by the ellipses of FIG. 5, a similar process may be performed by decoders using modulation schemes 2 through N in channels 2 through M. In an additional example, a first correlation threshold is used to identify packets using a first modulation scheme in a first channel, and a second correlation threshold is used to identify packets using a second modulation scheme in the first channel. Under some circumstances, the range of acceptable false packet detections may be changed. For example, at least one of an upper endpoint and a lower endpoint of the range may be based at least in part on a number of channels defined in spectrum used by the method 500.

Accordingly, FIG. 5 shows that a number "M" of channels and/or channel plans may be defined, and that digital output from one or all "M" channels and/or channel plans may be sent to one or all of a number "N" of decoders, each decoder being associated with a modulation scheme. One or more correlation thresholds may be used to judge the sufficiency of correlation between incoming signals to an expected preamble. In an example, one correlation threshold is used for each channel. In a further example, one correlation threshold may be used for some or all channel and modulation scheme combinations.

Figure 6:
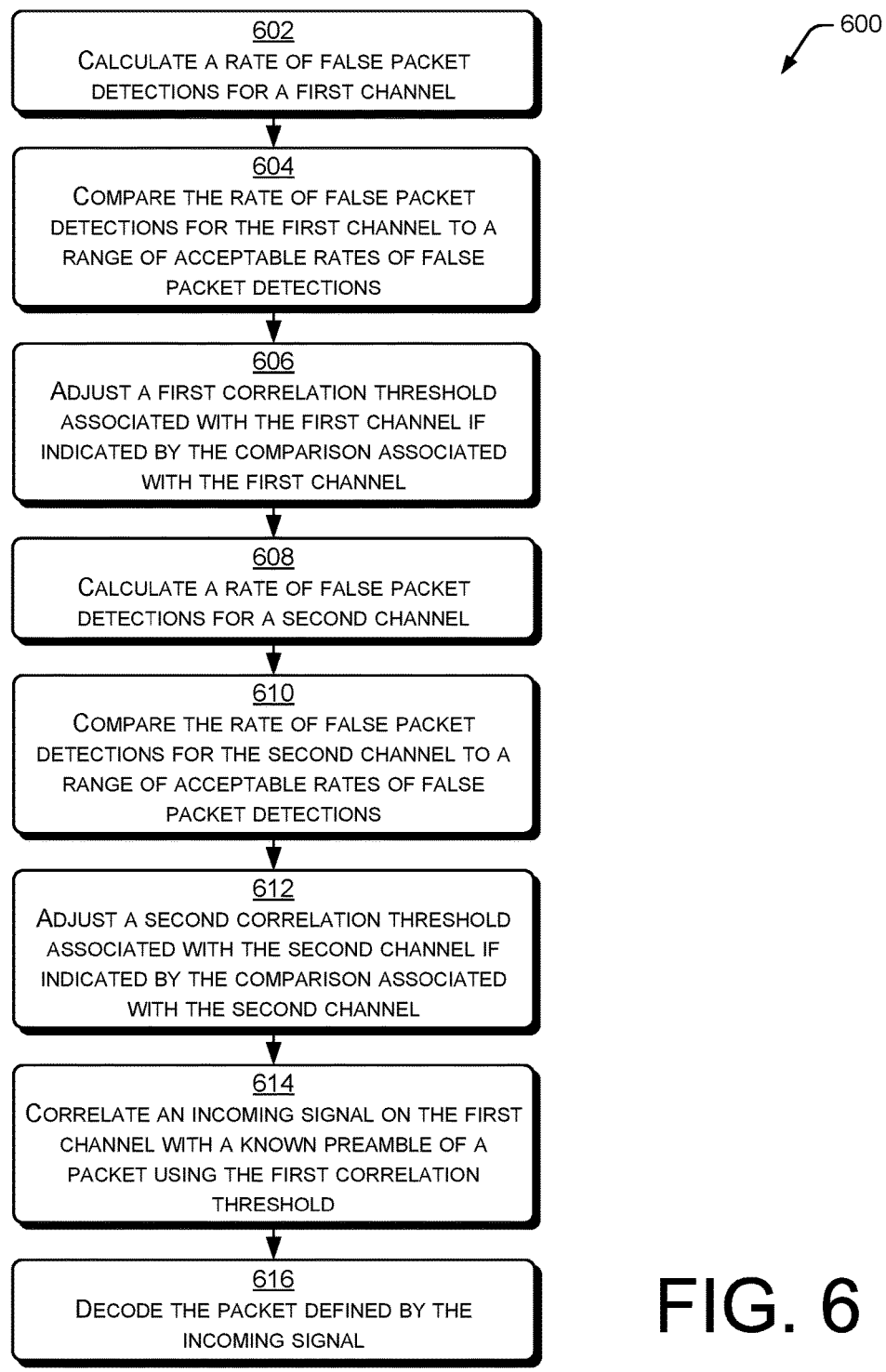
FIG. 6 is a flow diagram showing example techniques by which false packet detections are monitored, and accounted for, in each of a plurality of different channel plans and/or modulation schemes, and by which corresponding correlation thresholds may be adjusted.

FIG. 6 shows example techniques 600 by which a rate of false packet detections may be determined (e.g., for each channel, each channel plan and/or each modulation scheme). Additionally, the techniques show how the rate may be used to adjust a correlation threshold. And further, the techniques show how the correlation threshold may be used to determine if an incoming RF signal correlates to a packet preamble of interest. In some examples, the RF signal is below a noise floor. In the example techniques 600, a processor, radio digital backend or other logic device calculates a rate of false packet detections, compares the rate to a range, and makes appropriate adjustment to a correlation threshold, for a plurality of channels or channel plans in a sequential manner. That is, calculations for each channel may be performed before moving to the next channel. Alternatively, the logic device could calculate a plurality of rates of false packet detections for a plurality of respective channels, then compare the calculated rates to appropriate ranges for the plurality of channels, and then adjust correlation thresholds as indicated. That is, each of the calculations associated with a plurality of channels may be performed in parallel.

In an example, parallel processing is useful in an asynchronous environment when it is not known when a packet is going to arrive, and on which channel, and potentially according to which modulation scheme. In such an environment, signals on different channels may be processed in a random (or semi-random) order. Within the parallel processing, different signals may be at different blocks in state machine(s) and not synchronous with each other. In some examples, a plurality of state machines may correspond with a plurality of modulation schemes, and may govern the decoding of incoming signal(s). Accordingly, signals are received at random (or semi-random) times and channels, and are processed in a parallel manner, though the processing may be at different states in the same or different state machines. Thus, while some examples shown may include or describe synchronous signal reception and processing, by extension the examples explain the asynchronous processing of randomly received signals on randomly used channels, potentially involving decoding by operation of different states in the same or different state machines associated with the same or different modulation schemes.

At block 602, a rate of false packet detections for a first channel is calculated. In some examples, the rate of false packet detections may be calculated two or more times in a single channel using two or more modulation schemes, respectively. In each calculation, the rate of false packet detections may be based on a rate at which signals on each channel correlate with a desired packet preamble, but are later revealed to be falsely correlated. The false correlation may be revealed if a decoder encounters errors when attempting to decode a packet payload. The calculated rates of false packet detections may be based on any desired time period.

At block 604, the rate of false packet detections for the first channel is compared to a range of acceptable rates of false packet detections. As discussed at block 408 of FIG. 4, the rate of false packet detections calculated for any channel or channel plan can be within, below, or above the range of acceptable false packet detections. In some examples, the range can be fixed. In other examples, the range may be changed, such as in response to a change in the number of channels defined in the RF spectrum, a number of network nodes, a number of modulation schemes in use and/or other factors. While the rate of false packet detections for each channel may change over minutes or hours, the range of acceptable false packet detections may remain constant over months or years, depending on changes to the network.

At block 606, a correlation threshold associated with the first channel may be adjusted, if indicated by the comparison. In the example of FIG. 4, if the rate of false packet detections is within range of acceptable rates of false packet detections, the correlation threshold is not adjusted. However, if the rate of false packet detections is below or above the range of acceptable rates of false packet detections, the correlation threshold is lowered or raised, respectively. In an example, the correlation threshold may be adjusted differently in different channels, such as by increasing the correlation threshold for channels in response to calculated rates of false packet detections for the channels being greater than the range of acceptable rates of false packet detections, and decreasing the correlation threshold for channels in response to the calculated rate of false packet detections for the channels being less than the range of acceptable rates of false packet detections. Thus, a second correlation threshold, different from the first correlation threshold used in a first channel, may be used to determine if a signal in a second channel defines a packet. And generally, correlation may be defined in different channels using different correlation thresholds, which may be adjusted in real time or at intervals.

At block 608, a rate of false packet detections is calculated for a second channel (and/or other channels). At block 610, the rate of false packet detections for the second channel (and/or other channels) is compared to a range of acceptable rates of false packet detections. At block 612, a correlation threshold associated with the second channel (and/or other channels) may be adjusted, if indicated by the comparison (e.g., at block 610).

At block 614, an incoming signal on a channel (e.g., a first channel from among a plurality of channels) may be correlated with a known preamble of a packet using an adjusted correlation threshold associated with the first channel. Other incoming signals on other channels may be correlated with known packet preambles using adjusted correlation thresholds associated with those channels. At block 616, the packet(s) defined by the incoming signal(s) are decoded.

Figure 7:
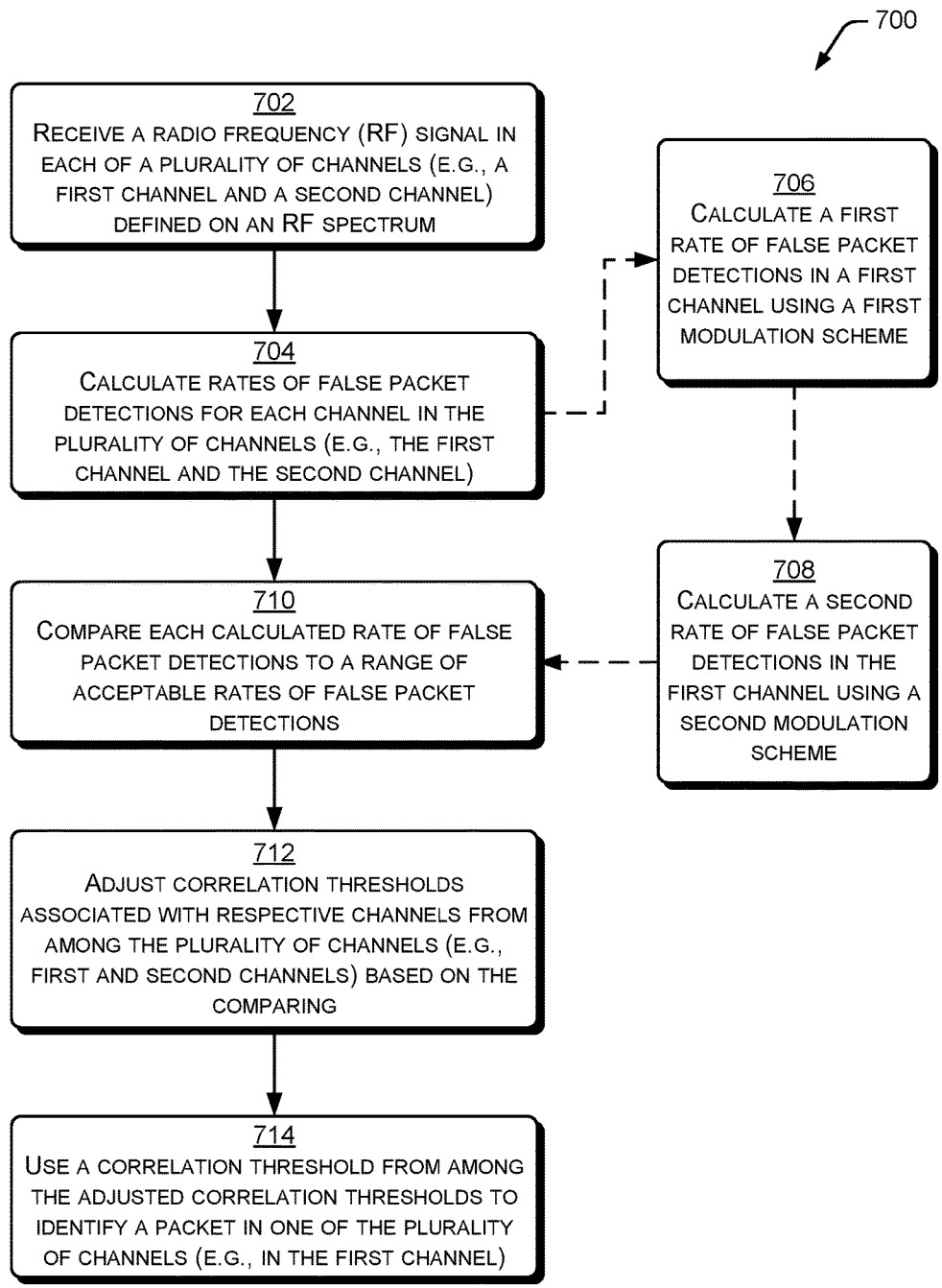
FIG. 7 is a flow diagram showing additional example techniques by which false packet detections are managed in each of a plurality of different channel plans and/or modulation schemes, and by which corresponding correlation thresholds may be adjusted.

FIG. 7 shows example techniques 700 by which rates of false packet detections are determined for each of a plurality of different channels, channel plans and/or modulation schemes, and by which corresponding correlation thresholds (for use in correlating incoming signals to packet preamble types) may be adjusted.

At block 702, a radio frequency (RF) signal may be received in one, some or all of a plurality of channels defined on an RF spectrum (e.g., a first channel and a second channel). The signals may be synchronous or asynchronous, potentially arriving at random times and/or channels, and potentially using different modulation schemes. The channels may be organized according to channel plans having one or more channels and/or modulation scheme per channel plan.

At block 704, rates of false packet detections may be calculated for each channel from among the plurality of channels. In an example of the techniques, a rate of false packet detections may be calculated for each channel. In alternative examples, a rate of false packet detections may be calculated based on channel plans or for all channels. And in further alternatives, different rates of false packet detections can be calculated for each of a plurality of respective modulation schemes used in particular channel(s) or channel plan(s).

Blocks 706 and 708 provide an example of optional techniques, wherein a rate of false packet detections may be calculated for each of two or more modulation schemes used in a single channel. Thus, while different rates of false packet detections may be used in different channels based on different levels and/or types of interference found in those channels, different rates of false packet detections may be used in a single channel based on how different modulation schemes respond to the levels and/or types of interference found in a single channel. At block 706, a first rate of false packet detections may be calculated for a particular channel using a first modulation scheme. At block 708, a second rate of false packet detections may be calculated for the particular channel using a second modulation scheme. Different correlation thresholds for use with each modulation scheme in the same channel may be determined (e.g., at blocks 710, 712) based on the different rates of false packet detections. Use of the different correlation thresholds with the different modulation schemes in the same channel may provide a better response for each modulation scheme to the interference seen in the particular channel.

At block 710, each calculated rate of false packet detections may be compared to a range of acceptable false packet detections. In an example, a single range of acceptable rates of false packet detections may be used for each channel, or each channel plan, and/or each modulation scheme. In a further example, different rates of false packet detections may be compared to different ranges of acceptable rates of false packet detections. The different ranges may be associated with different RF spectrums, networks, channels, channel plan(s), and/or modulation scheme(s).

At block 712, correlation thresholds—each threshold associated with a channel from among the plurality of channels—may be adjusted. The adjustment may be made based at least in part on the comparing of block 710. In some examples, different correlation thresholds may be adjusted for use with each of a plurality of different channels, for each of a plurality of different channel plans, and/or for each of a plurality of different modulation schemes. In other examples, a single correlation threshold may be adjusted for user with all channels, channel plans and/or modulation schemes associated with RF spectrum. In a further example, a plurality of correlation thresholds may be adjusted, with the adjusting performed such that each adjusted correlation threshold changes sensitivity within a respective channel. And in a still further example, a plurality of correlation thresholds may be adjusted, such that each adjusted correlation threshold changes sensitivity of one of a plurality of modulation schemes. And further, while a single modulation scheme may be used in a channel or across a channel plan, a plurality of decoders associated with a plurality of modulation schemes may receive input associated with a channel plan and use a plurality of different correlation thresholds, respectively.

At block 714, a correlation threshold from among the adjusted correlation thresholds is used to identify a packet in one of the plurality of channels. The identified packet can then be decoded using an appropriate modulation scheme.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving and processing, at an analog frontend, a radio frequency (RF) signal;
   receiving, at a digital backend, digital signals based on the processed RF signal;
   defining, by operation of a channelizer of the digital backend, a plurality of channels;
   calculating, by operation of a logic device, a plurality of rates of false packet detections associated with the plurality of channels, respectively;
   adjusting, by operation of a correlation threshold calculator, based at least in part on a first rate of false packet detections from among the plurality of rates of false packet detections, a first correlation threshold associated for use with a first channel from among the plurality of channels and for use with a first modulation scheme;
   correlating, using a packet processor, a signal from the channelizer with a preamble of a packet, wherein the correlating is based at least in part on the first correlation threshold, the first channel and the first modulation scheme, wherein the packet processor comprises a plurality of correlation loops, each correlation loop associated with a respective correlation threshold from among a plurality of correlation thresholds adjusted by the correlation threshold calculator, and wherein at least some of the plurality of correlation thresholds are used to evaluate correlation of signals in a particular channel plan and at least some are used to evaluate correlation of signals using a particular modulation scheme;
   decoding, by operation of one of a plurality of decoders, the packet within the first channel using the first modulation scheme.

2. The method of claim 1, wherein the correlation threshold calculator performs further actions comprising:
   adjusting correlation thresholds associated with each of the plurality of correlation loops of the packet processor.

3. The method of claim 1, wherein:
   detecting the packet and detecting a second packet are performed using the same modulation scheme.

4. The method of claim 1, wherein:
   adjusting the first correlation threshold comprises increasing the first correlation threshold; and
   adjusting a second correlation threshold comprises decreasing the second correlation threshold.

5. The method of claim 1, wherein adjusting the first correlation threshold comprises:
   increasing the first correlation threshold in response to detecting an increased rate of false packet detections received via the first channel; or
   decreasing the first correlation threshold in response to detecting a decreased rate of false packet detections received via the first channel.

6. The method of claim 1, wherein adjusting the first correlation threshold comprises:
   comparing a rate of false packet detections for the first channel to a range of acceptable rates of false packet detections; and
   adjusting the first correlation threshold if the rate of false packet detections for the first channel is outside the range of acceptable rates of false packet detections.

7. The method of claim 1, wherein adjusting the first correlation threshold comprises:
   increasing the first correlation threshold if a rate of false packet detections for the first channel is above a range of acceptable rates of false packet detections per unit time;
   decreasing the first correlation threshold if the rate of false packet detections for the first channel is below the range of acceptable rates of false packet detections per unit time; and
   not changing the first correlation threshold if the rate of false packet detections for the first channel is within the range of acceptable rates of false packet detections per unit time.

8. The method of claim 1, further comprising:
   calculating the first rate of false packet detections for the first channel, wherein the calculating is based on signals decoded in the first channel by a first modulation scheme, and wherein adjusting the first correlation threshold associated with the first channel is performed based at least in part on the rate of false packet detections calculated for the first channel; and
   calculating a second rate of false packet detections for a second channel, wherein the calculating is based on signals decoded in the second channel by the first modulation scheme, and wherein adjusting a second correlation threshold associated with the second channel is performed based at least in part on the rate of false packet detections calculated for the second channel.

9. The method of claim 1, additionally comprising:
   adjusting the first correlation threshold based at least in part on a range of acceptable rates of false packet detections; and setting at least one of an upper endpoint and a lower endpoint of the range of acceptable rates of false packet detections, wherein the setting is based at least in part on a number of channels defined in spectrum used by the digital backend.

10. A radio, comprising:
an analog frontend to receive and process a radio frequency (RF) signal;
an analog to digital converter communicatively coupled to the analog frontend to convert an analog signal from the analog frontend to a digital signal; and
a digital backend, communicatively coupled to the analog to digital converter to receive the digital signal from the analog to digital converter, comprising:
  a packet processor, comprising a plurality of correlation loops, each correlation loop associated with a respective correlation threshold from among a plurality of correlation thresholds, wherein at least some of the plurality of correlation thresholds are used to measure correlation using a particular channel plan and at least some are used to measure correlation using a particular modulation scheme, and wherein the packet processor processes data from a plurality of decoders;
wherein the digital backend performs actions comprising:
  calculating a first rate of false packet detections for a first channel;
  adjusting a first correlation threshold associated with the first channel, wherein the adjusting of the first correlation threshold associated with the first channel is performed based at least in part on a comparison of the first rate of false packet detections to a range of acceptable rates of false packet detections;
  correlating a first incoming signal on the first channel with a first known preamble of a first packet using the first correlation threshold;
  decoding the first packet defined by the first incoming signal;
  calculating a second rate of false packet detections for a second channel.

11. The radio as recited in claim 10, wherein the actions further comprise:
comparing the first rate of false packet detections to a range of acceptable rates of false packet detections, wherein the adjusting of the first correlation threshold associated with the first channel is performed based at least in part on the comparison of the first rate of false packet detections to the range of acceptable rates of false packet detections;
calculating a second rate of false packet detections for the second channel;
comparing the second rate of false packet detections to the range of acceptable rates of false packet detections, wherein the adjusting of the second correlation threshold associated with the second channel is performed based at least in part on the comparison of the second rate of false packet detections to the range of acceptable rates of false packet detections.

12. The radio as recited in claim 10, wherein:
decoding the first packet is performed using a first modulation scheme; and
decoding the second packet is performed using a second modulation scheme, different from the first modulation scheme.

13. The radio as recited in claim 10, wherein the actions additionally comprise:

increasing the first correlation threshold if a first rate of false packet detections, in the first channel, is greater than a range of acceptable rates of false packet detections; and
decreasing the second correlation threshold if a second rate of false packet detections, in the second channel, is less than the range of acceptable rates of false packet detections.

14. The radio as recited in claim 13, wherein the actions additionally comprise:
changing the range of acceptable rates of false packet detections, wherein the changing is based at least in part on changes to a number of channels defined in spectrum received by the radio.

15. The radio as recited in claim 10, wherein the actions additionally comprise:
calculating a first rate of false packet detections, associated with the first channel using a first modulation scheme; and
calculating a second rate of false packet detections, associated with the first channel using a second modulation scheme.

16. A radio, comprising:
an analog frontend to receive and process a radio frequency (RF) signal;
a digital backend, to receive digital signals based on the process RF signal, the digital backend comprising:
  a packet processor, comprising a plurality of correlation loops, each correlation loop associated with a respective correlation threshold from among a plurality of correlation thresholds, wherein at least some of the plurality of correlation thresholds are used to measure correlation using a particular channel plan and at least some are used to measure correlation using a particular modulation scheme, and wherein the packet processor processes data from a plurality of decoders;
wherein the digital backend performs actions comprising:
  receiving a first RF signal in a first channel, wherein the first channel is defined in an RF spectrum;
  adjusting a first correlation threshold for use with the first channel;
  using the first correlation threshold to identify a first packet in the first channel;
  receiving a second RF signal in a second channel, wherein the second channel is different from the first channel, and wherein the second channel is defined in the RF spectrum;
  adjusting a second correlation threshold for use with the second channel, wherein the first correlation threshold and the second correlation threshold are different; and
  using the second correlation threshold to identify a second packet in the second channel.

17. The radio as recited in claim 16, wherein the actions further comprise:
calculating a rate of false packet detections for the first channel, wherein adjusting the first correlation threshold associated with the first channel is performed based at least in part on the rate of false packet detections calculated for the first channel; and
calculating a rate of false packet detections for the second channel, wherein adjusting the second correlation threshold associated with the second channel is performed based at least in part on the rate of false packet detections calculated for the second channel, and wherein the first correlation threshold and the second correlation threshold are different.

18. The radio as recited in claim 16, wherein:
adjusting the first correlation threshold comprises increasing the first correlation threshold; and
adjusting the second correlation threshold comprises decreasing the second correlation threshold.

19. The radio as recited in claim 16, wherein the actions further comprise:
calculating a rate of false packet detections for the first channel over a measurement period of one hour or less.

20. The radio as recited in claim 16, wherein:
adjusting the first correlation threshold comprises using a first range of acceptable rates of false packet detections; and
adjusting the second correlation threshold comprises using a second range of acceptable rates of false packet detections.

* * * * *